(12) United States Patent
Demers et al.

(10) Patent No.: US 10,214,368 B2
(45) Date of Patent: Feb. 26, 2019

(54) SYSTEM USING MAGNETIC COUPLING TO MOVE A CARRIAGE

(71) Applicant: NJM Packaging Inc., Saint-Laurent (CA)

(72) Inventors: Maxime Demers, Laval (CA); Alexandre Lebel, Laval (CA)

(73) Assignee: NJM PACKAGING INC., Vancouver, BC (CA)

( * ) Notice: Subject to any disclaimer, the term of this patent is extended or adjusted under 35 U.S.C. 154(b) by 443 days.

(21) Appl. No.: 14/921,656

(22) Filed: Oct. 23, 2015

(65) Prior Publication Data

US 2017/0113884 A1    Apr. 27, 2017

(51) Int. Cl.
| | |
|---|---|
| *B65G 65/23* | (2006.01) |
| *B65G 54/02* | (2006.01) |
| *B66F 9/06* | (2006.01) |
| *B66F 9/20* | (2006.01) |
| *B66F 1/00* | (2006.01) |

(52) U.S. Cl.
CPC ........... *B65G 65/23* (2013.01); *B65G 54/025* (2013.01); *B66F 1/00* (2013.01); *B66F 9/06* (2013.01); *B66F 9/205* (2013.01)

(58) Field of Classification Search
CPC .......... B65G 65/23; B65G 54/025; B66F 1/00
See application file for complete search history.

(56) References Cited

U.S. PATENT DOCUMENTS

| | | | |
|---|---|---|---|
| 2,708,022 A | 5/1955 | Pettigrew | |
| 3,109,532 A | 11/1963 | Milan | |
| 3,476,232 A | 11/1969 | Robert et al. | |
| 3,621,979 A | 11/1971 | Robert | |
| 4,197,934 A | * 4/1980 | Matsui | B61B 13/04 |
| | | | 104/287 |
| 7,694,804 B2 | 4/2010 | Stoiber | |
| 8,100,891 B2 | 1/2012 | Baur | |

(Continued)

FOREIGN PATENT DOCUMENTS

| | | |
|---|---|---|
| CN | 102140885 A | 8/2011 |
| EP | 43399 | 1/1982 |

(Continued)

*Primary Examiner* — Saul Rodriguez
*Assistant Examiner* — Ashley K Romano
(74) *Attorney, Agent, or Firm* — Thompson Hine LLP

(57) ABSTRACT

A system for moving a receptacle. The system includes: a coupling wall; an internal carriage provided substantially adjacent the coupling wall, the internal carriage being movable along the coupling wall along a predetermined path; an external carriage provided substantially adjacent the coupling wall and substantially in register with the internal carriage with the coupling wall extending between the internal and external carriages, the external carriage being movable along the coupling wall, the external carriage including a receptacle attachment for securing the receptacle thereto; and a carriage actuator operatively coupled to the internal carriage for moving the internal carriage along the predetermined path. The internal and external carriages are magnetically coupled to each other across the coupling wall so that when the internal carriage is moved along the predetermined path, the external carriage follows the internal carriage and remains substantially in register therewith.

21 Claims, 5 Drawing Sheets

(56) References Cited

U.S. PATENT DOCUMENTS

| | | |
|---|---|---|
| 8,827,071 B2 | 9/2014 | Van De Loecht |
| 9,446,902 B2 * | 9/2016 | Aumann ................ B65G 17/32 |
| 2011/0109173 A1 * | 5/2011 | Sugita .................... H02K 33/16 310/12.18 |
| 2012/0018282 A1 * | 1/2012 | Loecht ................... B65G 19/02 198/725 |
| 2013/0270072 A1 * | 10/2013 | Mihai .................... B65G 23/18 198/805 |

FOREIGN PATENT DOCUMENTS

| | | | |
|---|---|---|---|
| EP | 3028965 A1 * | 6/2016 | ............ B65G 17/32 |
| GB | 1063707 | 3/1967 | |
| GB | 1065452 | 4/1967 | |
| JP | 61009104 | 1/1986 | |
| JP | 3288725 | 12/1991 | |
| JP | 9020414 | 1/1997 | |
| JP | 2006306567 A | 11/2006 | |
| KR | 775026 | 11/2007 | |
| WO | 2005018708 | 3/2005 | |
| WO | 2009060518 A1 | 5/2009 | |

* cited by examiner

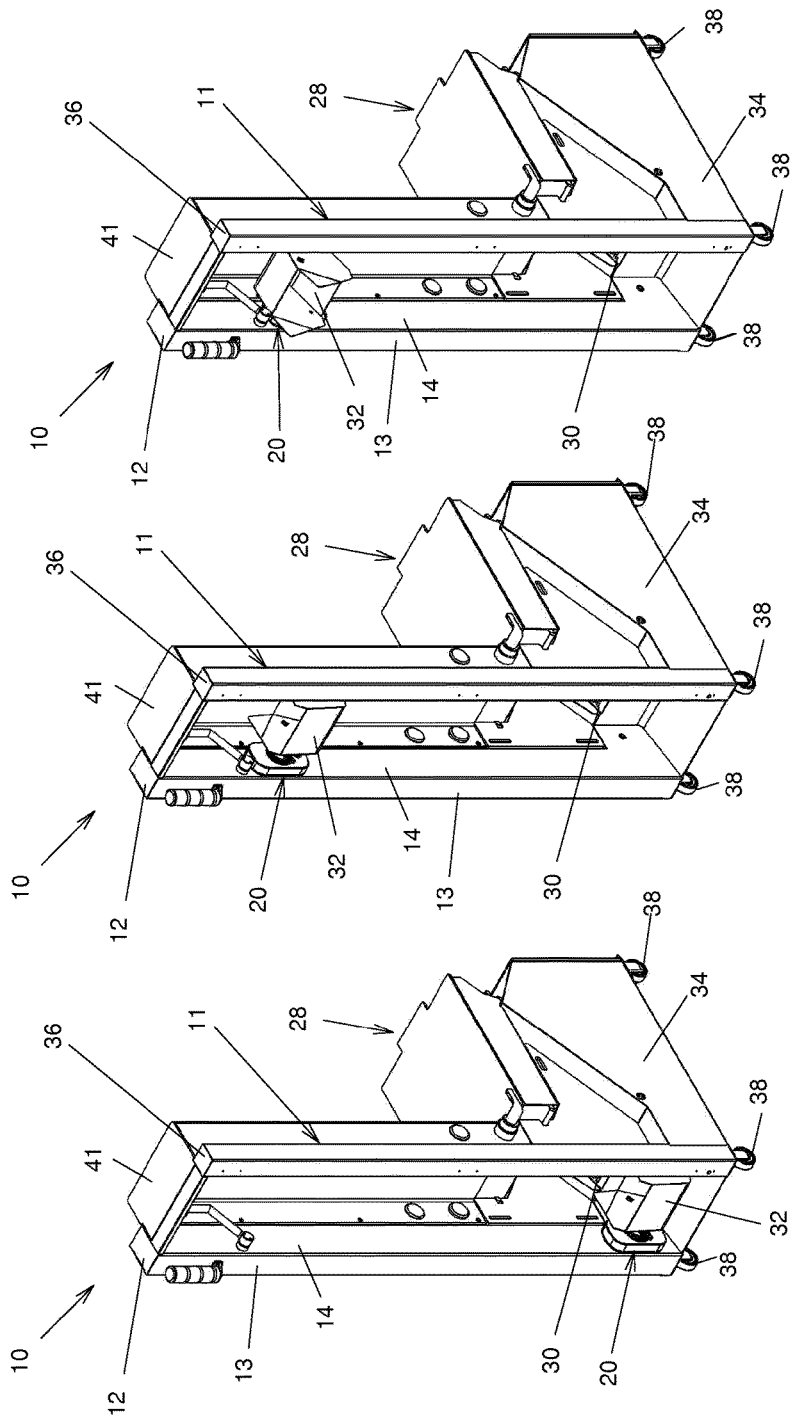

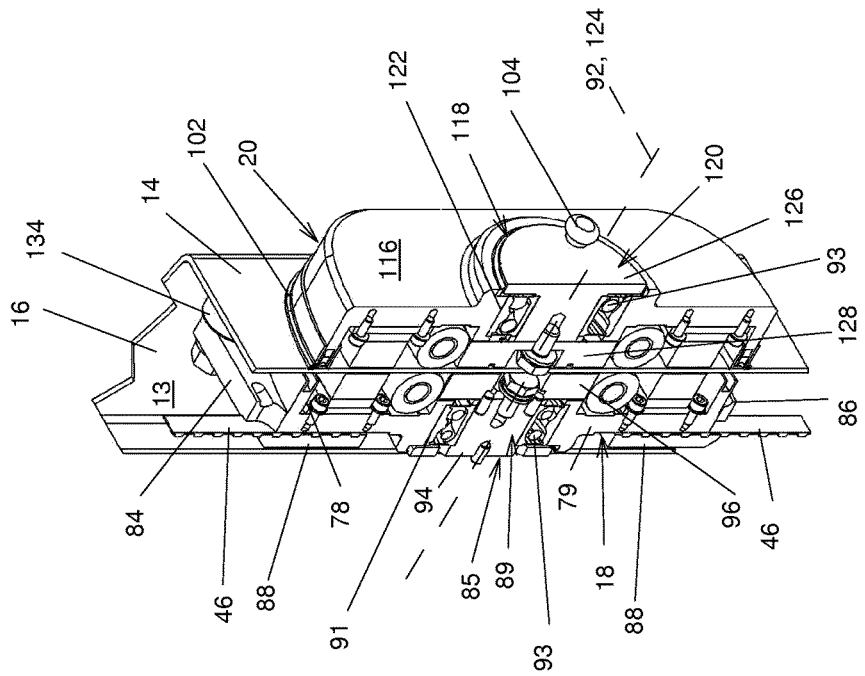
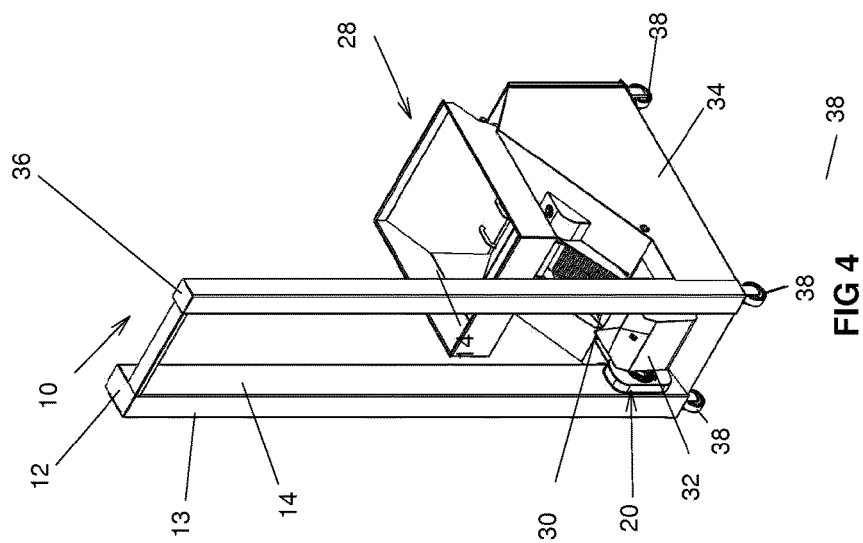

SYSTEM USING MAGNETIC COUPLING TO MOVE A CARRIAGE

FIELD OF THE INVENTION

The present invention relates to the general field of handling, and is more particularly concerned with a system using magnetic coupling to move a carriage.

BACKGROUND

Many industrial processes require that the manufactured object be lifted or otherwise moved during the process. This is the case for example in the pharmaceutical industry wherein tablet elevators are commonly used. One drawback of currently existing tablet elevators is that the lifting mechanism is exposed to ambient air. The lifting mechanism includes for example motors and belts or chains that lower and raise a container in which the tablets to handle are stored. Even when a manufacturing process is optimized to reduce dust production, it is almost inevitable that some of the compound that forms the tablet will be dispersed in ambient air and be deposited in the lifting mechanism. Therefore, to avoid contamination when a different product is manufactured with the tablet elevator, a thorough, and therefore time consuming, cleaning of the tablet elevator is needed. This cleaning is often made difficult by the grease and oil that may cover some of the moving parts of the lifting mechanism.

Accordingly, there exists a need for an improved system for moving a carriage. It is a general objective of the present invention to provide such a system.

SUMMARY OF THE INVENTION

In a broad aspect, the invention provides a system for moving a receptacle, the system including: a coupling wall; an internal carriage provided substantially adjacent the coupling wall, the internal carriage being movable along the coupling wall along a predetermined path; an external carriage provided substantially adjacent the coupling wall and substantially in register with the internal carriage with the coupling wall extending between the internal and external carriages, the external carriage being movable along the coupling wall, the external carriage including a receptacle attachment for securing the receptacle thereto; and a carriage actuator operatively coupled to the internal carriage for moving the internal carriage along the predetermined path. The internal and external carriages are magnetically coupled to each other across the coupling wall so that when the internal carriage is moved along the predetermined path, the external carriage follows the internal carriage and remains substantially in register therewith.

The invention may also provide a system wherein the coupling wall is part of a sealed enclosure defining a cavity, the internal carriage being provided in the cavity.

The invention may also provide a system wherein the coupling wall is substantially vertical.

The invention may also provide a system wherein at least one of the internal and external carriages includes a permanent magnet for magnetically coupling the internal and external carriages to each other.

The invention may also provide a system wherein the internal and external carriages include respectively an internal carriage magnet and an external carriage magnet, the internal and external carriage magnets being substantially in register with each other with the coupling wall therebetween.

The invention may also provide a system wherein the internal and external carriage magnets have opposite poles thereof facing each other.

The invention may also provide a system wherein the internal and external carriage magnets are both permanent magnets.

The invention may also provide a system wherein the coupling wall is ferromagnetic or non-ferromagnetic.

The invention may also provide a system wherein the internal carriage is provided with three additional internal carriage magnets and the external carriage is provided with three additional external carriage magnets, the internal and external carriage magnets defining four pairs of magnets, each of the pair of magnets including one of the internal carriage magnets substantially in register with a corresponding one of the external carriage magnets, the internal and external carriage magnets within each of the pair of magnets having opposite poles thereof facing each other, the internal carriage magnets being arranged in a substantially rectangular configuration, diagonally opposed ones of the internal carriage magnets having a same pole facing the coupling wall, and laterally opposed ones of the internal carriage magnets having different poles facing the coupling wall.

The invention may also provide a system wherein at least one of the internal and external carriages abuts against the coupling wall and is provided with a friction reducing element facilitating movement thereof along the coupling wall.

The invention may also provide a system wherein the friction reducing element includes a substantially freely rotatable roller abutting against the coupling wall.

The invention may also provide a system wherein the carriage actuator includes a belt extending substantially parallel to the coupling wall, the internal carriage being mounted to the belt; and a motor operatively coupled to the belt for selectively moving the belt to move the internal carriage along the predetermined path.

The invention may also provide a system wherein the internal carriage includes an internal carriage body and an internal carriage rotatable assembly rotatably mounted to the internal carriage body so as to be rotatable relative thereto about an internal carriage rotation axis substantially perpendicular to the coupling wall; the external carriage includes an external carriage body and an external carriage rotatable assembly rotatably mounted to the external carriage body so as to be rotatable relative thereto about an external carriage rotation axis substantially perpendicular to the coupling wall, the internal and external carriage rotation axes being substantially collinear; the receptacle attachment is jointly rotatable with the external carriage rotatable assembly; the internal and external carriage rotatable assemblies are magnetically coupled to each other so that rotation of the internal carriage rotatable assembly about the internal carriage rotation axis causes a corresponding rotation of the external carriage rotatable assembly about the external carriage rotation axis; and the system further comprises a tilting mechanism for selectively rotating the internal carriage rotatable assembly about the internal carriage rotation axis.

The invention may also provide a system wherein the internal and external carriage rotatable assemblies include respectively internal carriage rotatable assembly permanent magnets and external carriage rotatable assembly permanent magnets, each of the internal carriage rotatable assembly permanent magnets being in register with a respective one of the external carriage rotatable assembly permanent magnets, the internal and external carriage rotatable assembly permanent magnets that are in register with each other presenting opposite poles to each other.

The invention may also provide a system wherein the tilting mechanism includes a guiding track extending along the coupling wall and an actuating lever extending from the internal carriage rotatable assembly and engaging the guiding track, the guiding track including guiding track first and second portions that are distanced differently from the predetermined path, causing the internal carriage rotatable assembly to rotate relative to the internal carriage body when the internal carriage moves between portions of the predetermined path in which the actuating lever engages the guiding track first and second portions.

The invention may also provide a system wherein the external carriage includes a substantially rigid external carriage body, the external carriage further including a seal extending between the external carriage body and the coupling wall, the external carriage body and seal together defining a sealed enclosure.

The invention may also provide a system further comprising a pair of substantially parallel and spaced apart guiding walls, the coupling wall being substantially perpendicular to the guiding walls and extending therebetween, the internal carriage being provided with guiding rollers abutting against each of the guiding walls and rollable about roller axes that are substantially perpendicular to the coupling wall, the guiding walls causing the predetermined path to be substantially rectilinear.

Advantageously, the system allows transmission of movement across the wall without requiring contact between the external and internal carriages. This configuration is advantageous in many applications, for example when one of the internal and external carriages needs protection from contamination or temperature differences, among other possibilities.

In another broad aspect, the invention provides an elevator, the elevator including: a body, the body including a substantially upstanding column defining a coupling wall and a cavity extending within the column along the coupling wall; an internal carriage provided in the cavity substantially adjacent the coupling wall, the internal carriage being movable along the coupling wall; an external carriage provided outside of the cavity substantially adjacent the coupling wall and substantially in register with the internal carriage, the external carriage being movable along the coupling wall; a carriage actuator provided in the column and operatively coupled to the internal carriage for moving the internal carriage along the coupling wall. The internal and external carriages are magnetically coupled to each other across the coupling wall. Using the carriage actuator to move the internal carriage along the coupling wall correspondingly moves the external carriage along the coupling wall due to magnetic interactions between the internal and external carriages.

The invention may also provide an elevator further comprising magnets, wherein the magnets define at least one pair of magnets including two magnets that are in register with each other across the coupling wall, the at least one pair of magnets including a first magnet part of the internal carriage and positioned substantially adjacent the coupling wall; and a second magnet part of the external carriage and positioned substantially adjacent the coupling wall and substantially in register with the first magnet; the first and second magnets having opposite poles thereof facing each other across the coupling wall.

The invention may also provide an elevator wherein the elevator is usable to raise tablets, the elevator further comprising: a receptacle mounted to the external carriage; a tablet distributor for selectively distributing the tablets; and a tablet discharge operatively coupled to the tablet distributors for receiving the tablets when the tablets are distributed by the tablet distributor; wherein the internal carriage is movable between a lower position and an upper position, wherein, in the lower position, the receptacle is substantially adjacent to the tablet discharge and positioned for receiving thereinto the tablets from the tablet discharge, and, in the upper position, the receptacle is above the tablet distributor.

The invention may also provide an elevator further comprising a tilting mechanism, wherein the internal carriage is further movable to a tilting position, wherein in the tilting position, the receptacle is tilted by the tilting mechanism so that the tablets are discharged from the receptacle.

While the present invention is useful in the case of an elevator in which the coupling wall extends substantially vertically, it is within the scope of the invention to have coupling walls having any other orientation, for example a slanted or horizontal orientation.

Advantageously, the proposed elevator may be sealed so that the carriage actuator is completely enclosed and therefore protected from the environment in which the elevator is used. For example, the carriage actuator is protected from contamination by dust. Accordingly, when the elevator is used in two successive processes between which cleaning is required, the cleaning operation may be relatively easily performed, especially if the elevator is manufactured with a minimal number of bends and cavities.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the drawings:

FIG. 1, in a perspective view, illustrates an elevator in accordance with an embodiment of the present invention, the elevator being shown in a first configuration;

FIG. 2, in a perspective view, illustrates the elevator of FIG. 1, the elevator being shown in a second configuration;

FIG. 3, in a perspective view, illustrates the elevator of FIGS. 1 and 2, the elevator being shown in a third configuration;

FIG. 4, in a perspective view with parts removed, illustrates the elevator of FIGS. 1 to 3, the elevator being shown in the first configuration;

FIG. 5, in a perspective cross-sectional view, illustrates an internal carriage, an external carriage and part of a coupling wall all part of the elevator shown in FIGS. 1 to 4;

FIG. 10, in a perspective view, illustrates the guiding track second portion and part of the guiding track first portion of the carriage actuator shown in FIGS. 8 and 9.

DETAILED DESCRIPTION

Figure 6:
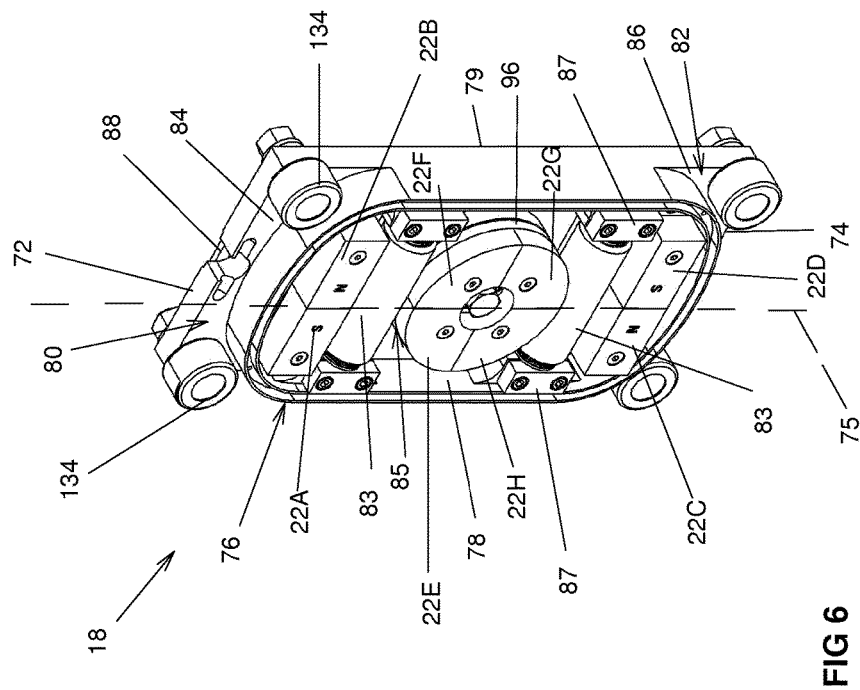
FIG. 6, in a perspective view, illustrates the internal carriage shown in FIG. 5.

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Generally speaking, the invention relates to a system for moving a receptacle, such as a container 32, seen in FIGS. 1 to 3. The receptacle may however take any alternative suitable form, such as non-limitingly, a platform, an open-top container or an enclosed container, among other possibilities. The system includes a coupling wall, an internal carriage, an external carriage and a carriage actuator, such as coupling wall 14, internal carriage 18, external carriage 20 and carriage actuator 26 described hereinbelow. However, more generally, the coupling wall, internal carriage, external carriage and carriage actuator may take any other suitable form.

As seen for example in FIG. 5, the internal carriage 18 is provided substantially adjacent the coupling wall 14. The internal carriage 18 is movable along the coupling wall 14 along a predetermined path. Typically, the predetermined path is substantially rectilinear, but in some embodiments, the predetermined path may be of any other suitable shape.

The external carriage 20 is provided substantially adjacent the coupling wall 14 and substantially in register with the internal carriage 18 with the coupling wall 14 extending between the internal and external carriages 18 and 20. The external carriage 20 is movable along the coupling wall 14. The external carriage 20 includes a receptacle attachment (not shown in FIG. 5) for securing the receptacle thereto, either permanently or removably therefrom.

The carriage actuator 26 is operatively coupled to the internal carriage 18 for moving the internal carriage 18 along the predetermined path. The internal and external carriages 18 and 20 are magnetically coupled to each other across the coupling wall 14 so that when the internal carriage 18 is moved along the predetermined path, the external carriage 20 follows the internal carriage 18 and remains substantially in register therewith. Thus, movement of the internal carriage 14 along the predetermined path is transmitted to the external carriage without requiring contact therebetween.

With reference to FIGS. 1 to 3, there is shown such a system in accordance with an embodiment of the present invention in the form of an elevator 10. The elevator 10 includes a body 11, the body 11 including a column 12 defining the coupling wall 14 and the cavity 16 (better seen in FIG. 5) extending within the column 12 along the coupling wall 14. In some embodiments, the cavity 16 is sealed so that particles and/or fluids outside of the cavity 16 are prevented from entering the cavity 16. This protects any components of the elevator 10 that are within the cavity 16 from contamination. However, in alternative embodiments, the cavity 16 is not sealed.

Still referring to FIG. 5, the internal carriage 18 is provided in the cavity 16 substantially adjacent the coupling wall 14. The internal carriage 18 is movable along the coupling wall 14 along the predetermined path. The external carriage 20 is provided outside of the cavity 16 substantially adjacent the coupling wall 14 and substantially in register with the internal carriage 18. The internal carriage 18 is movable along the coupling wall 14 by the carriage actuator 26.

The internal and external carriages 18 and 20 are magnetically coupled to each other across the coupling wall 14 so that using the carriage actuator 26 to move the internal carriage 18 along the coupling wall 14 correspondingly moves the external carriage 20 along the coupling wall 14 due to magnetic interactions between the internal and external carriages 18 and 20. This magnetic interaction uses at least one magnet in one of the internal and external carriages 18 and 20. This magnet may be a permanent magnet, or an electromagnet. The magnetic interaction may also use either another magnet or a ferromagnetic element in the other one of the internal and external carriages 18 and 20. The internal and external carriages 18 and 20 are typically configured to magnetically attract each other across the coupling wall 14, but magnetic repulsion is also used to the same effect in alternative embodiments of the invention.

Figure 7:
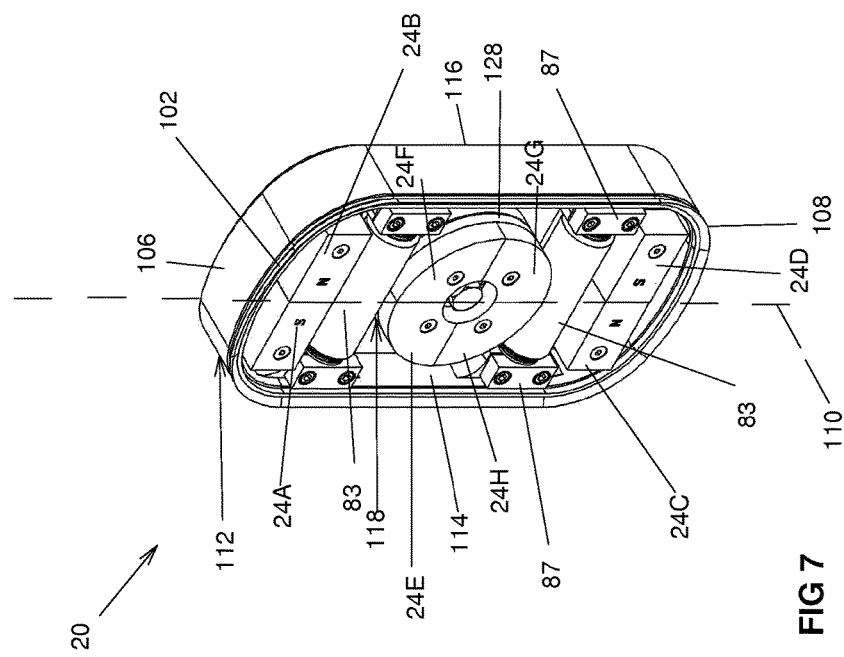
FIG. 7, in a perspective view, illustrates the external carriage shown in FIG. 5.

As seen in FIGS. 6 and 7 respectively, in the specific embodiment of the invention shown in the drawings, the internal and external carriages 18 and 20 are provided with internal and external carriage magnets 22A to 22H and 24A to 24H respectively. The internal and external carriage magnets 22A to 22H and 24A to 24H define at least one pair of magnets including two internal and external carriage magnets 22A to 22H and 24A to 24H that are in register with each other across the coupling wall 14. The at least one pair of magnets includes a first magnet selected from internal carriage magnets 22A to 22H part of the internal carriage 18 and positioned substantially adjacent the coupling wall 14 and a second magnet selected from external carriage magnets 24A to 24H part of the external carriage 20 and positioned substantially adjacent the coupling wall 14 and substantially in register with the first magnet. The first and second magnets have opposite poles thereof facing each other across the coupling wall 14. More details regarding the configuration of magnets 22A to 22H and 24A to 24H are provided hereinbelow.

Figure 8:
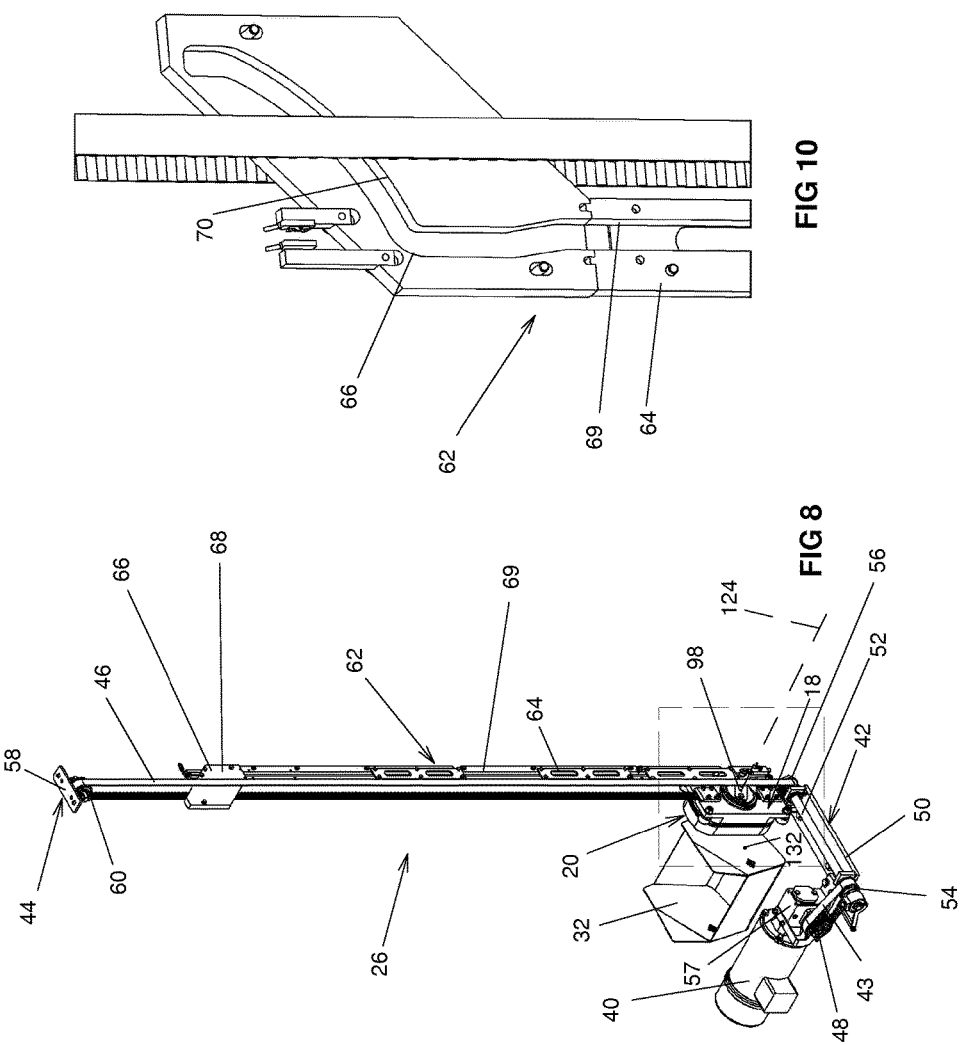
FIG. 8, in a perspective view, illustrates a carriage actuator part of the elevator shown in FIGS. 1 to 4 assembled to the internal carriage shown in FIG. 6, the internal carriage being shown coupled to the external carriage shown in FIG. 7, the external carriage having a container mounted thereto, the carriage actuator including a guiding track, the guiding track including guiding track first and second portions.

Referring to FIG. 8, the carriage actuator 26 is provided at least in part in the column 12 (not seen in FIG. 8) and operatively coupled to the internal carriage 18 for moving the internal carriage 18 along the coupling wall 14 (not seen in FIG. 8). Typically, the carriage actuator 26 is also provided in a part of the elevator 10 that is sealed from the environment. Using the carriage actuator 26 to move the internal carriage 18 along the coupling wall 14 correspondingly moves the external carriage 20 along the coupling wall 14 due to magnetic interactions between the internal carriage magnets 22A to 22H and the external carriage magnets 24A to 24H. Typically, a container 32, or any other suitable structure such as a platform, for example, is mounted to the external carriage 20 so as to be jointly movable therewith.

Referring back to FIGS. 1 to 3, the elevator 10 here is shown in the form of a tablet elevator usable to take tablets (not shown in the drawings) from a tablet distributor 28 part of the elevator 10 and raise the tablets to a level higher than the tablet distributor 28. The tablet distributor 28 is for example a conventional tablet distributor including a tablet discharge 30 for selectively discharging the tablets and will not be described in further details hereinbelow. Also, the present invention is usable in any other suitable context, and not necessarily only in the context of tablet elevators. Furthermore, while an elevator 10 used to carry and move the container 32 vertically is shown in the drawings, the present invention is also usable to move containers or other structure along non-rectilinear, slanted or horizontal paths, among others.

The body 11 may take any suitable shape. For example, the body 11 includes a body base 34 from which a pair of substantially laterally spaced apart columns 12 and 36 extend substantially vertically substantially parallel to each other. In alternative embodiments, the column 36 is omitted. The tablet distributor 28 is mounted to the body base 34 with the tablet discharge 30 substantially adjacent the columns 12 and 36, for example laterally centred relative thereto, adjacent the bottom portion thereof. In some embodiments, the body base 34 is provided with bottom wheels 38 provided on the bottom surface thereof to facilitate moving the elevator 10. In some embodiments, a cover panel 41 extends across the columns 12 and 36 above the tablet discharge 30 to prevent objects other than the tablets coming from the tablet discharge 30 from entering the container 32. The body 11 may be manufactured in a conventional manner using sheet metal, and where needed, a frame to support the sheet metal.

In some embodiments, only the column 12 needs to be hollow to define the cavity 16 so that the container 32 is only supported by one external carriage 20. However, in alternative embodiments, the column 36 is also hollow and may include therein another assembly including an internal carriage 18 and a carriage actuator 26, another external carriage 20 being mounted to the container 32 adjacent the column 36 so that the container 32 is then supported by two opposed external carriages 20.

For example, the column 12 is substantially parallelepiped shaped and hollow so that the cavity 16 includes the whole interior of the column 12. The cavity 16 may also extend into the body base 34 which may also be hollow so that part of the carriage actuator 26 is provided in the body base 34.

The coupling wall 14 is typically substantially planar and is part of the column 12. The coupling wall 14 faces laterally inwardly so that the external carriage 20 is moved above the body base 34. In some embodiments, the coupling wall 14 is non-ferromagnetic so that the internal and external carriage magnets 22A to 22H and 24A to 24H are not attracted to the coupling wall 14. However, in alternative embodiments, the coupling wall 14 is ferromagnetic so that the coupling wall 14 is magnetically attracted by the internal and external carriage magnets 22A to 22H and 24A to 24H.

In some embodiments, a conventional discharge (not shown in the drawings), such as a chute, is mounted adjacent the upper end of the body 11 to guide tablets that are discharged thereinto.

With reference to FIG. 8, the carriage actuator 26 includes a motor 40, for example an electrical motor 40, a transmission 42, a transmission belt 43, a belt mount 44 and a carriage belt 46 for mounting the internal carriage 18 thereto. In some embodiments, the carriage actuator 26 also includes a guiding track 62 for selectively controlling pivotal movements of the container 32 as described in further details hereinbelow. Also, although not shown in the drawings, the carriage actuator 26 typically includes a conventional controller to allow manual or automated operation of the carriage actuator 26, and a conventional power supply powering the motor 40 and the controller.

The motor 40 is for example fixedly mounted inside the body base 34 (not shown in FIG. 8) and is operatively coupled the carriage belt 46 for selectively moving the carriage belt 46 to move the internal carriage 18 along the predetermined path. This coupling is for example as follows. The motor 40 is operatively coupled to an output pulley 48 for selectively rotating the output pulley 48 upon actuation of the motor 40, for example through an output shaft of the motor 40. The transmission 42 is provided substantially adjacent the motor 40 and includes a transmission base 50 fixedly mounted inside the body base 34, a transmission axle 52 mounted to the transmission base 50 so as to be rotatable about its longitudinal axis and a pair of transmission pulleys 54 and 56 each mounted to the transmission axle 52 substantially adjacent the opposite ends thereof so as to be jointly rotatable therewith. The transmission pulley 54 is substantially coplanar with the output pulley 48 and provided substantially adjacent thereto with the transmission belt 43 extending therebetween so that rotation of the output pulley 48 results in rotation of the transmission pulley 54. In some embodiments, a gearbox 57 is also provided between the motor 40 and the output pulley 48 to reduce the speed of the rotational movement of the motor 40 between the motor 40 and the output pulley 48.

The belt mount 44 includes a belt mount bracket 58 fixedly mounted to the column 12 (not shown in FIG. 8), for example inside the cavity 16 (not shown in FIG. 8) substantially adjacent the top portion of the column 12 using suitable fasteners, welding or soldering, and a belt mount pulley 60 rotatably mounted to the belt mount bracket 58. The belt mount pulley 60 and transmission pulley 56 are substantially coplanar and provided adjacent opposite ends of the column 12. The carriage belt 46 is mounted to the belt mount pulley 60 and transmission pulley 56 so that rotation of the transmission pulley 56 results in movement of the carriage belt 46 about the belt mount pulley 60 and transmission pulley 56.

The carriage belt 46 may be a closed loop belt to which the internal carriage 18 is mounted, or, as seen in FIG. 8, may be an open belt having both ends thereof mounted to opposite ends of the internal carriage 18. The carriage belt 46 is typically substantially parallel to the coupling wall 14.

The output pulley 48, transmission belt 43, transmission pulleys 54 and 56, carriage belt 46 and belt mount pulley 60 may be toothed or not, depending on the design of the carriage actuator 26.

It should be noted that the carriage actuator 26 may take any other suitable form. For example the carriage belt 46 could be replaced by a chain. Also, instead of including a motor 40, an hydraulic system, a linear actuator or any other suitable type of carriage actuator could be used, as long as the alternative carriage actuator allows selective movements of the internal carriage 18 along the coupling wall 14.

Figure 9:
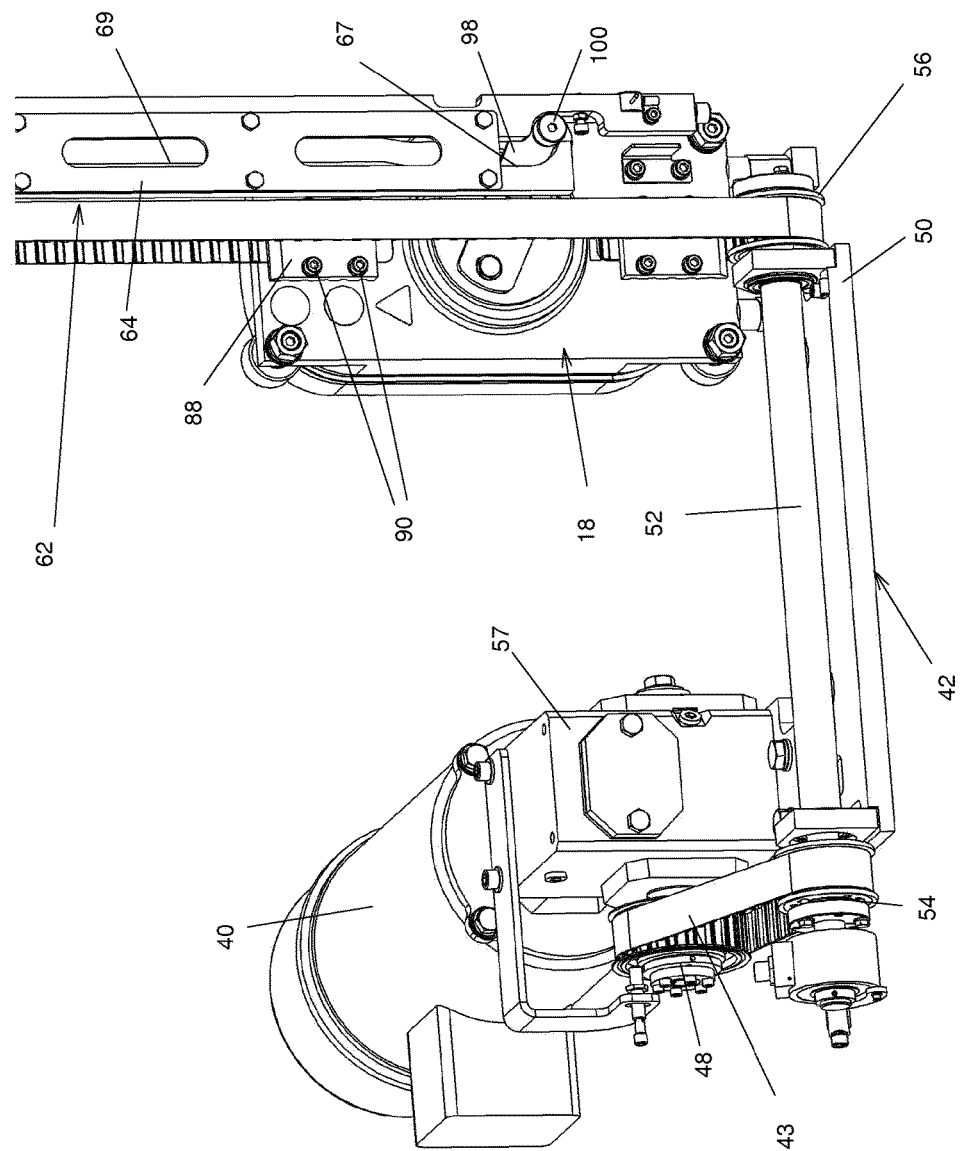
FIG. 9, in a partial perspective view, illustrates the carriage actuator shown in FIG. 8 with the guiding track first portion being partially shown and the guiding track second portion being out of view.

When present, the guiding track 62 is fixedly mounted inside the cavity 16 in any suitable manner and includes a guiding track first portion 64 extending for example upwardly from the interior of the body base 34 substantially parallel to the carriage belt 46 and defining a guiding track first portion upper end 66. As better seen in FIG. 9, the guiding track first portion 64 defines a first portion guiding groove 69 extending generally vertically aligned between the two sides of the carriage belt 46, but offset therefrom. In some embodiments, the guiding track first portion 64 defines at its lower end an offset segment 67 that is laterally offset relative to the reminder of the guiding track first portion 64. Referring for example to FIG. 10, a guiding track second portion 68 extends from the guiding track first portion 64 substantially adjacent the guiding track first portion upper end 66 and defines a second portion guiding groove 70 extending generally upwardly at an oblique angle relative to the horizontal, towards and through the loop formed by the carriage belt 46. The second portion guiding groove 70 is in prolongation of the first portion guiding groove 69.

Referring to FIG. 6, the internal carriage 18 defines substantially opposed internal carriage ends 72 and 74 that define an internal carriage longitudinal axis 75 therebetween. The internal carriage 18 includes an internal carriage body 76 defining an internal carriage cavity 78 thereinto that opens towards the coupling wall 14 (not shown in FIG. 6), an internal carriage outer wall 79 delimiting the internal carriage cavity 78 opposite the coupling wall 14 and a pair of substantially opposed belt mounting portions 80 and 82 that extend each substantially adjacent a respective one of the internal carriage ends 72 and 74. The internal carriage magnets 22A to 22D that are mounted inside the internal carriage cavity 78. In some embodiments, the internal carriage 18 also includes an internal carriage rotatable assembly 85 rotatably mounted to the internal carriage body 76 and the internal carriage magnets 22E to 22H.

Typically, the internal carriage 18 includes a friction reducing element facilitating movement thereof along the coupling wall 14. For example, the friction reducing element take the form of a pair of rollers 83 that are substantially freely rotatable and abutting against the coupling wall 14. However, other friction reducing elements, such as sliders made of a friction-reducing material, for example Teflon™, provided between the coupling wall 14 and the internal carriage body 76 are also usable.

The belt mounting portions 80 and 82 include for example respectively flanges 84 and 86 and each a clamping members 88 (only one of which is shown in FIG. 6) provided in register with a respective one of the flanges 84 and 86. As better seen in FIG. 5, the carriage belt 46 is insertable between the flanges 84 and 86 and the clamping members 88 and secured therebetween using fasteners 90 (seen in FIG. 9), such as bolts, that firmly bias the clamping members 88 towards the flanges 84 and 86.

Returning to FIG. 6, the rollers 83 are for example substantially cylindrical and freely rotatably mounted inside the internal carriage cavity 78 perpendicularly to the internal carriage longitudinal axis 75 substantially longitudinally opposed to each other. The rollers 83 protrude from the internal carriage cavity 78 and are rollable along the coupling wall 14 to facilitate movements of the internal carriage 18 therealong. For example the rollers 83 are each mounted between a pair of laterally opposed roller mounts 87 secured to the internal carriage body 76.

The internal carriage magnets 22A to 22D are mounted inside the internal carriage cavity 78, for example using suitable fasteners. In some embodiments, the internal carriage magnets 22A to 22D protrude from the internal carriage cavity 78 and are positioned to be very close or even in contact with the coupling wall 14. However, typically, the internal carriage magnets 22A to 22D are dimensioned so that while they are very close to or contact the coupling wall 14, they do not fully engage the coupling wall 14 so as to minimize friction therebetween. Internal carriage magnets 22A and 22B are provided substantially adjacent the internal carriage end 72 and laterally opposed relative to the internal carriage longitudinal axis 75. Internal carriage magnets 22C and 22D are provided substantially adjacent the other internal carriage end 74 and laterally opposed relative to the internal carriage longitudinal axis 75. Internal carriage magnets 22A and 22B have opposite poles thereof facing the coupling wall 14 and internal carriage magnets 22C and 22D have opposite poles thereof facing the coupling wall 14.

Typically, longitudinally opposed internal carriage magnets 22A to 22D also have opposite poles facing the coupling wall 14. Thus, diagonally opposed ones of the internal carriage magnets 22A to 22D have a same pole facing the coupling wall 14, and laterally opposed ones of the internal carriage magnets 22A to 22D have different poles facing the coupling wall 14.

Referring to FIG. 5, the internal carriage rotatable assembly 85 includes an internal carriage rotatable assembly body 89 mounted inside an internal carriage mounting aperture 91 extending through the internal carriage outer wall 79 using a bearing 93 so as to allow substantially free rotation thereof about an internal carriage rotation axis 92 extending substantially perpendicularly to the coupling wall 14.

The internal carriage rotatable assembly body 89 defines an internal carriage rotatable assembly body outer portion 94 provided outside of and opposite the internal carriage cavity 78 and an internal carriage rotatable assembly body inner portion 96 provided inside of the internal carriage cavity 78. As seen in FIG. 8, the internal carriage rotatable assembly body outer portion 94 is provided with an actuating lever 98 extending substantially parallel to the coupling wall 14 and having a wheel 100 mounted thereto so as to be rotatable about an axis parallel and eccentric relative to the internal carriage rotation axis 92. The wheel 100 is mounted in the guiding track 62, and more particularly in the first and second portion guiding grooves 69 and 70 so as to be movable therealong. Returning to FIG. 6, the internal carriage magnets 22E to 22H are mounted to the internal carriage rotatable assembly body inner portion 96 facing the coupling wall 14 in a generally annular configuration about the internal carriage rotation axis 92 (not shown in FIG. 6). The poles of the internal carriage magnets 22E to 22H facing the coupling wall 14 alternate along the circumference of the annular configuration they form.

In some embodiments, track rollers 134 are provided at the corners of the internal carriage 18 for abutting against the inside surface of the column 12 to stabilize the internal carriage 18. The track rollers 134 are each for example rotatably mounted to the flanges 84 and rotatable about an axis that is parallel to the internal carriage rotation axis 92. The track rollers 134 and are dimensioned so that they all abut against the internal surface of the column 12, and more specifically against two substantially parallel and spaced apart guiding walls 13, only one of which being shown in FIG. 5. The coupling wall 14 is substantially perpendicular to the guiding walls 13 and extends therebetween. The guiding walls 13, along with the coupling wall 14, cause the predetermined path to be substantially rectilinear.

Referring to FIG. 7, the external carriage 20 is similar to the internal carriage 18 except that the belt mounting portions 80 and 82, and the track rollers 134, are omitted, a seal 102 is provided, and the actuating lever 98 and wheel 100 are replaced by a container mount 104, better seen in FIG. 5.

More specifically, referring to FIG. 7, the external carriage 20 defines substantially opposed external carriage ends 106 and 108 that define an external carriage longitudinal axis 110 therebetween. The external carriage 20 includes an external carriage body 112 defining an external carriage cavity 114 thereinto that opens towards the coupling wall 14 (not shown in FIG. 7) and an external carriage outer wall 116 delimiting the external carriage cavity 114 opposite the coupling wall 14. The external carriage 20 also includes friction reducing elements in the form of a pair of rollers 83 and the external carriage magnets 24A to 24D that are mounted inside the external carriage cavity 114, although similarly to the internal carriage 18, other types of friction reducing elements may be used. Furthermore, in some embodiments, the external carriage 20 also includes an external carriage rotatable assembly 118 and the external carriage magnets 24E to 24H.

The rollers 83 are for example substantially cylindrical and freely rotatably mounted inside the external carriage cavity 114 perpendicularly to the external carriage longitudinal axis 110 substantially longitudinally opposed to each other. The rollers 83 protrude from the external carriage cavity 114 are rollable along the coupling wall 14 to facilitate movements of the external carriage 20 therealong. For example the rollers 83 are each mounted between a pair of laterally opposed roller mounts 87 secured to the external carriage body 112.

The external carriage magnets 24A to 24D are mounted inside the external carriage cavity 114 similarly to the way the internal carriage magnets 22A to 22D are mounted inside the internal carriage cavity 78. The external carriage magnets 24A to 24D are each substantially in register with one of the internal carriage magnets 22A to 22D, internal and external carriage magnets 22A to 22D and 24A to 24D that face each other having opposite poles that face each other across the coupling wall 14.

As seen in FIG. 5, the external carriage rotatable assembly 118 includes an external carriage rotatable assembly body 120 mounted inside an external carriage mounting aperture 122 extending through the external carriage outer wall 116 using a bearing 93 so as to allow substantially free rotation thereof about an external carriage rotation axis 124 extending substantially perpendicularly to the coupling wall 14 and substantially collinear with the internal carriage rotation axis 92.

The external carriage rotatable assembly body 120 defines an external carriage rotatable assembly body outer portion 126 provided outside of and opposite the external carriage cavity 114 and an external carriage rotatable assembly body inner portion 128 provided inside the external carriage cavity 114. The external carriage rotatable assembly body outer portion 126 is provided with the container mount 104, which may for example include one or more fasteners securable to the external carriage rotatable assembly body outer portion 126 and insertable in a suitably located aperture (not shown in the drawings) in the container 32. However, any other suitable manner of mounting the container 32 to the external carriage rotatable assembly body outer portion 126 is within the scope of the invention. The container 32 is mounted to the container mount 104 with its container centre of gravity 132 offset relative to the external carriage rotation axis 124, as seen in FIG. 8. The container mount 104 thus defines a receptacle attachment that is jointly rotatable with the external carriage rotatable assembly 118.

Returning to FIG. 7, the external carriage magnets 24E to 24H are mounted to the external carriage rotatable assembly body inner portion 128 similarly to the way the internal carriage magnets 22E to 22H are mounted to the internal carriage rotatable assembly body inner portion 96, with each one of the internal carriage magnets 22E to 22H facing one of the external carriage magnets 24E to 24H that has an opposite polarity across the coupling wall 14.

The seal 102 is provided along the peripheral edge of the external carriage cavity 114 between the external carriage body 112, which is typically substantially rigid, and the coupling wall 14 and is made for example of a resiliently deformable element, such as a silicone or rubber seal, or a brush, that substantially seals the external carriage body 112 against the coupling wall 14 so that little or no contamination may enter the external carriage cavity 114, thus defining a sealed enclosure.

As seen for example in FIG. 8, in some embodiments, the wheel 100 and the centre of gravity 132 of the container 32 are provided on opposite sides of a vertical plane containing the external carriage rotation axis 124. The wheel 100 is guided along the guiding track 62 as the container 32 is moved up and down, which controls the angle of the container 32 relative to the horizontal. Thus, the guiding track 62 and actuating lever 98 are part of a tilting mechanism usable for selectively rotating the internal carriage rotatable assembly 85 about the internal carriage rotation axis 92.

In use, the elevator 10 is operable between first, second and third configurations, as shown respectively in FIGS. 1, 2 and 3. Change between the first, second and third configurations is made by moving the carriage belt 46 using the motor 40. More specifically, the motor 40 rotates the output pulley 48, which in turn rotates the transmission pulleys 54 and 56, which result in movements of the carriage belt 46 about the transmission pulley 56 and the belt mount pulley 60. Since the internal and external carriages 18 and 20 move along a substantially vertical rectilinear path, passage of the wheel 100 through the various portions of the first and second portion guiding grooves 69 and 70 rotates the actuating lever 98 to control the orientation of the container 32. More specifically, the guiding track first and second portions 64 and 68 are distanced differently from the predetermined path along which the internal carriage 18 moves. This causes the internal carriage rotatable assembly 85 to rotate relative to the internal carriage body 76 when the internal carriage 18 moves between portions of the predetermined path in which the actuating lever 98 engages the guiding track first and second portions 64 and 68.

Magnetic coupling between the internal and external carriages 18 and 20, through the internal and external carriage magnets 22A to 22H and 24A to 24H, ensures that the internal and external carriages 18 and 20 remain in register with each other and that the internal carriage rotatable assembly 85 and external carriage rotatable assembly 118 are jointly rotatable about the internal carriage rotation axis 92 and external carriage rotation axis 124.

In the first configuration, seen in FIG. 1, the container 32 is substantially adjacent the tablet discharge 30, in a lower position, and may receive tablets dispensed thereby. The container 32 opens substantially upwardly in this configuration. To that effect, the wheel 100 is suitable positioned and the container 32 is suitably oriented relative to the external carriage 20 so that when the wheel 100 is in the first portion guiding groove 69 below the internal and external carriage rotation axes 92 and 124, the container 32 opens substantially upwardly. When present, the offset segment 67 tilts the container 32 slightly towards the tablet discharge 30 to reduce risks of spillage when the container 32 is filled. Indeed, when the wheel 100 is in the offset segment 67, the actuating lever 98 is slightly rotated when compared to its position when the wheel 100 in the remainder of the first portion guiding groove 69.

In the second configuration, seen in FIG. 2, the carriage belt 46 has been moved using the motor 40 relative to the first configuration so that the internal carriage 18 is above its position in the first configuration, in an upper position above the tablet distributor, and adjacent the guiding track second portion 68. The wheel 100 is still in the first portion guiding groove 69 and the container 32 therefore still opens upwardly.

To reach the third configuration, seen in FIG. 3, movement of the carriage belt 46 has continued relative to the second configuration to move the internal carriage 18 to a tilting position. In addition to raising further the internal carriage 18, and therefore the container 32, this continued movement has moved the wheel 100 to the second portion guiding groove 70. The second portion guiding groove 70 has allowed rotation of the internal carriage rotatable assembly 85 so that the container 32 has tilted to open at an angle with the horizontal, downwardly. This allows discharging of the tablets contained therein.

Since the proposed elevator 10 mostly includes enclosed elements, cleaning of the elevator 10 is facilitated. It should be noted that in some embodiments, the elevator 10 is used for other purposes and that rotation of the container 32, or any other structure raised and lowered by the external carriage 20, is not required. Accordingly, in these embodiments, all structures related to rotation and not needed and the container 32 may be fixedly mounted to the external carriage body 112.

Also, in some embodiments, rotation of the container 32 is provided in any other suitable manner, for example using an electrical motor mounted to one of the internal and external carriages 18 and 20, among other possibilities.

Although the present invention has been described hereinabove by way of preferred embodiments thereof, it can be modified, without departing from the spirit and nature of the subject invention as defined in the appended claims.

What is claimed is:

1. A system for moving a receptacle, said system comprising:
   a coupling wall;
   an internal carriage provided substantially adjacent an internal side of said coupling wall, said internal carriage being movable along said coupling wall along a predetermined path;
   an external carriage provided substantially adjacent an external side of said coupling wall and substantially in register with said internal carriage with said coupling wall located between and structurally separating said internal and external carriages, said external carriage being movable along said coupling wall, said external carriage including a receptacle attachment for securing said receptacle thereto; and
   a carriage actuator operatively coupled to said internal carriage for moving said internal carriage along said predetermined path;
   wherein said internal and external carriages are magnetically coupled to each other by magnetic attraction across said coupling wall so that when said internal carriage is moved along said predetermined path, said external carriage follows said internal carriage as a result of said magnetic attraction and remains substantially in register therewith,
   wherein said internal carriage includes an internal carriage body and an internal carriage rotatable assembly rotatably mounted to said internal carriage body so as to be rotatable relative thereto about an internal carriage rotation axis substantially perpendicular to said coupling wall; said external carriage includes an external carriage body and an external carriage rotatable assembly rotatably mounted to said external carriage body so as to be rotatable relative thereto about an external carriage rotation axis substantially perpendicular to said coupling wall, said internal and external carriage rotation axes being substantially collinear; said receptacle attachment is jointly rotatable with said external carriage rotatable assembly; said internal and external carriage rotatable assemblies are magnetically coupled to each other so that rotation of said internal carriage rotatable assembly about said internal carriage rotation axis causes a corresponding rotation of said external carriage rotatable assembly about said external carriage rotation axis due to magnetic coupling forces; and
   said system further comprises a tilting mechanism for selectively rotating said internal carriage rotatable assembly about said internal carriage rotation axis wherein said tilting mechanism includes a guiding track extending along said coupling wall and an actuating lever extending from said internal carriage rotatable assembly and engaging said guiding track, said guiding track including guiding track first and second portions that are distanced differently from said predetermined path, causing said internal carriage rotatable assembly to rotate relative to said internal carriage body when said internal carriage moves between portions of said predetermined path in which said actuating lever engages said guiding track first and second portions.

2. The system as defined in claim 1, wherein said coupling wall is part of a sealed enclosure defining a cavity, said internal carriage being provided in said cavity.

3. The system as defined in claim 1, wherein said coupling wall is substantially vertical.

4. The system as defined in claim 1, wherein at least one of said internal and external carriages includes a permanent magnet for magnetically coupling said internal and external carriages to each other.

5. The system as defined in claim 4, wherein said internal and external carriages include respectively an internal carriage magnet and an external carriage magnet, said internal and external carriage magnets being substantially in register with each other with said coupling wall therebetween.

6. The system as defined in claim 5, wherein said internal and external carriage magnets have opposite poles thereof facing each other.

7. The system as defined in claim 5, wherein said internal and external carriage magnets are both permanent magnets.

8. The system as defined in claim 7, wherein said coupling wall is ferromagnetic.

9. The system as defined in claim 7, wherein said coupling wall is non-ferromagnetic.

10. The system as defined in claim 5, wherein said internal carriage is provided with three additional internal carriage magnets and said external carriage is provided with three additional external carriage magnets, said internal and external carriage magnets defining four pairs of magnets, each of said pair of magnets including one of said internal carriage magnets substantially in register with a corresponding one of said external carriage magnets, said internal and external carriage magnets within each of said pair of magnets having opposite poles thereof facing each other, said internal carriage magnets being arranged in a substantially rectangular configuration, diagonally opposed ones of said internal carriage magnets having a same pole facing said coupling wall, and laterally opposed ones of said internal carriage magnets having different poles facing said coupling wall.

11. The system as defined in claim 1, wherein at least one of said internal and external carriages abuts against said coupling wall and is provided with a friction reducing element facilitating movement thereof along said coupling wall.

12. The system as defined in claim 11, wherein said friction reducing element includes a substantially freely rotatable roller abutting against said coupling wall.

13. The system as defined in claim 1, wherein said carriage actuator includes
a belt extending substantially parallel to said coupling wall, said internal carriage being mounted to said belt; and
a motor operatively coupled to said belt for selectively moving said belt to move said internal carriage along said predetermined path.

14. The system as defined in claim 1, wherein said internal and external carriage rotatable assemblies include respectively internal carriage rotatable assembly permanent magnets and external carriage rotatable assembly permanent magnets, each of said internal carriage rotatable assembly permanent magnets being in register with a respective one of said external carriage rotatable assembly permanent magnets, said internal and external carriage rotatable assembly permanent magnets that are in register with each other presenting opposite poles to each other.

15. The system as defined in claim 1, wherein said external carriage includes a substantially rigid external carriage body, said external carriage further including a seal extending between said external carriage body and said coupling wall, said external carriage body and seal together defining a sealed enclosure.

16. The system as defined in claim 1, further comprising a pair of substantially parallel and spaced apart guiding walls, said coupling wall being substantially perpendicular to said guiding walls and extending therebetween, said internal carriage being provided with guiding rollers abutting against each of said guiding walls and rollable about roller axes that are substantially perpendicular to said coupling wall, said guiding walls causing said predetermined path to be substantially rectilinear.

17. An elevator, said elevator comprising:
a body, said body including a substantially upstanding column defining a coupling wall and a cavity extending within said column along said coupling wall;
an internal carriage provided in said cavity substantially adjacent said coupling wall, said internal carriage being movable along said coupling wall;
an external carriage provided outside of said cavity substantially adjacent said coupling wall and substantially in register with said internal carriage and without physical contact between said external carriage and said internal carriage, said external carriage being movable along said coupling wall;
a carriage actuator provided in said column and operatively coupled to said internal carriage for moving said internal carriage along said coupling wall;
wherein said internal and external carriages are magnetically coupled to each other across said coupling wall;
whereby using said carriage actuator to move said internal carriage along said coupling wall correspondingly moves said external carriage along said coupling wall due to magnetic interactions between said internal and external carriages.

18. The elevator as defined in claim 17, further comprising magnets, wherein
said magnets define at least one pair of magnets including two magnets that are in register with each other across said coupling wall, said at least one pair of magnets including
a first magnet part of said internal carriage and positioned substantially adjacent said coupling wall; and
a second magnet part of said external carriage and positioned substantially adjacent said coupling wall and substantially in register with said first magnet;
said first and second magnets having opposite poles thereof facing each other across said coupling wall.

19. The elevator as defined in claim 18, wherein said elevator is usable to raise tablets, said elevator further comprising:
a receptacle mounted to said external carriage; a tablet distributor for selectively distributing said tablets; and
a tablet discharge operatively coupled to said tablet distributors for receiving said tablets when said tablets are distributed by said tablet distributor;
wherein said internal carriage is movable between a lower position and an upper position, wherein, in said lower position, said receptacle is substantially adjacent to said tablet discharge and positioned for receiving thereinto said tablets from said tablet discharge, and, in said upper position, said receptacle is above said tablet distributor.

20. The elevator as defined in claim 19, further comprising a tilting mechanism, wherein said internal carriage is further movable to a tilting position, wherein in said tilting position, said receptacle is tilted by said tilting mechanism so that said tablets are discharged from said receptacle.

21. A system for moving a receptacle, the system comprising:
a coupling wall having a first side and a second side;
an internal carriage provided substantially adjacent the first side of the coupling wall, the internal carriage being movable along the coupling wall along a predetermined path;
an external carriage provided substantially adjacent the second side of the coupling wall and substantially in register with the internal carriage, wherein the coupling wall is located between the internal carriage and the external carriage, wherein the external carriage has no structural connection to the internal carriage, wherein the external carriage is movable along the coupling wall;
a receptacle connected to and movable with the external carriage; and
a carriage actuator operatively coupled to the internal carriage for moving the internal carriage along the predetermined path;
wherein the external carriage is magnetically coupled by magnetic attraction through the coupling wall to the internal carriage so that when the internal carriage is moved along the predetermined path, the external carriage follows the internal carriage as a result of the magnetic attraction.

* * * * *